March 24, 1942.   H. R. ARF   2,277,196
PACKING GLAND CONSTRUCTION
Filed Feb. 27, 1940
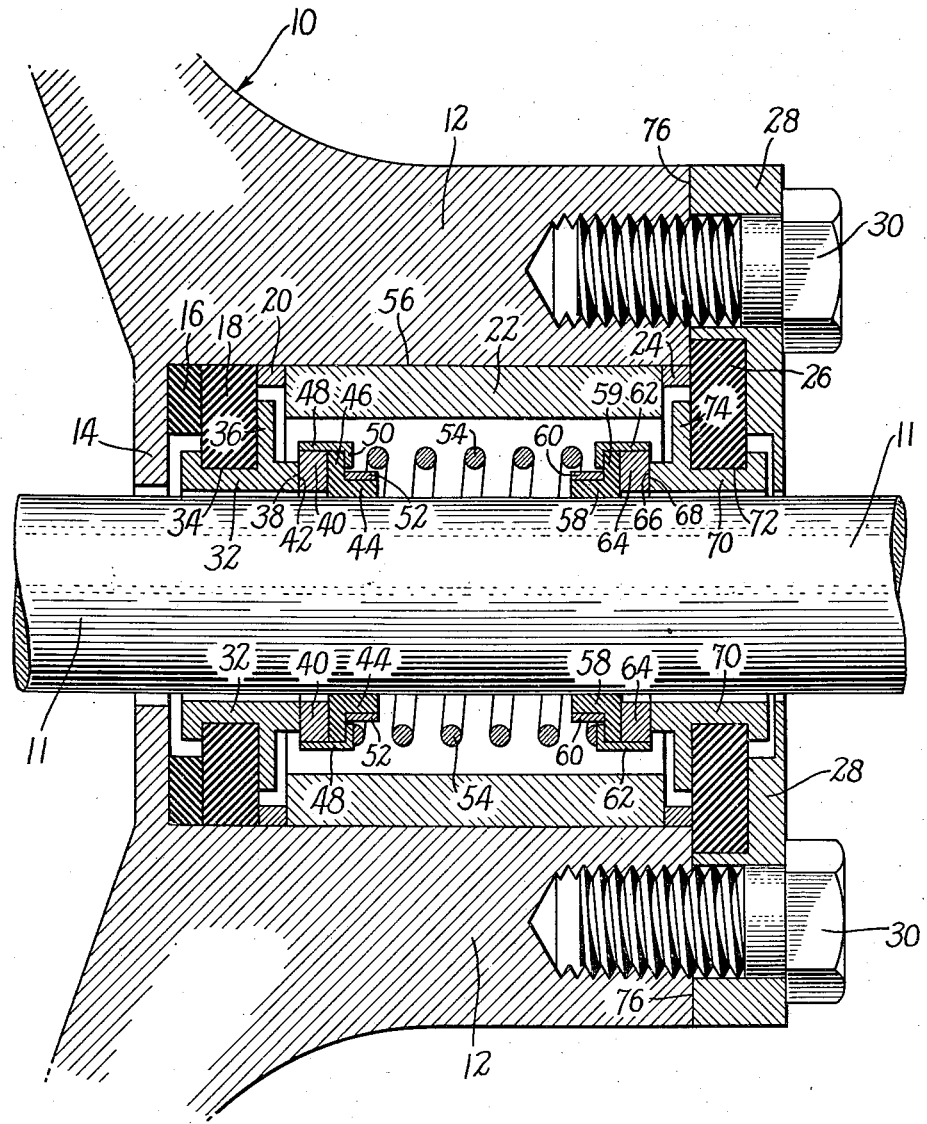
INVENTOR
*Herman Richard Arf*
BY
*Blair, Curtis + Hayward*
ATTORNEYS Patented Mar. 24, 1942

2,277,196

UNITED STATES PATENT OFFICE 2,277,196

PACKING GLAND CONSTRUCTION

Herman Richard Arf, Chicago, Ill., assignor to The Safety Car Heating and Lighting Company, Inc., a corporation of Delaware Application February 27, 1940, Serial No. 321,040

4 Claims. (Cl. 286—11)

This invention relates to packing gland construction and more in particular to a self-adjusting, fluid-tight shaft seal.

One of the objects of this invention is to provide a packing gland construction which is simple, practical, and thoroughly durable. Another object is to provide a construction of the above character which may be easily manufactured with a minimum of labor from inexpensive materials, and which is sturdy and durable under the strain of extended use. A further object is to provide a construction of the above character forming an efficient self-adjusting seal for a rotary shaft. Another object is to provide a construction such as the above, the parts of which may be readily replaced when worn. Other objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claims.

The accompanying drawing, in which is shown one of the various possible embodiments of my invention, is a longitudinal sectional view of a packing gland construction sealing a rotary shaft.

As conducive to a clearer understanding of certain features of the invention, it might here be pointed out that in preventing leakage of a fluid from a high pressure zone along a rotary shaft to a low pressure zone, it is difficult to provide a bearing for the shaft and a seal between the shaft and the bearing. This difficulty is aggravated by longitudinal movement of the shaft, which movement, although small, nevertheless alters the position of the sealing faces of the bearing. In accordance with the present invention, an automatically adjustable shaft-sealing unit, or packing gland, is provided with sufficient flexibility of adjustment to permit movement without disturbing the efficiency of the seal. Furthermore, such a sealing unit may be easily and quickly disassembled and assembled when necessary, as for example, if repairs are to be made. Accordingly, another object of this invention is to provide a practical construction of the above character in which the above-mentioned difficulties, in addition to many others, are successfully and efficiently overcome.

Referring now to the drawing in detail, there is illustratively shown a section of one wall of a pump casing generally indicated at 10 and having a hub 12 through which extends a rotary shaft 11. Shaft 11 transmits power to the pump rotary element (not shown) at the left, there being high pressure at the left of hub 12 and atmospheric pressure at the right. Thus, there is a tendency for fluid to leak out from the left to the right along shaft 11. Hub 12 is provided with a packing gland construction in accordance with the present invention which effectively prevents such leakage without interfering with the support and the free movement of shaft 11.

At the left, hub 12 is provided with an inwardly extending flange 14 which has its inner edge spaced from shaft 11 to permit free movement of the shaft, and held against flange 14 is a spacing ring 16, at the right of which is a supporting ring 18. Contacting the peripheral edge of the supporting ring 18, is an inner clamping ring 20, and to the right of clamping ring 20, is a sleeve 22, the right end of which is contacted by an outer clamping ring 24. Rigidly clamped against the right side of clamping ring 24 and against the end of hub 12, is an outer supporting ring 26, which is held in place by an end cover plate 28. End cover plate 28 is rigidly held in place by a plurality of stud bolts 30 screwed into the end of the hub.

Clamping rings 20 and 24 and sleeve 22 are metallic, while spacing ring 16 and supporting rings 18 and 26 are of resilient material, illustratively rubber. Thus, end cover plate 28 securely holds all of these elements in alignment, with rings 16, 18 and 26 squeezed and distorted, particularly at their outer edges. Supporting ring 18 resiliently carries an annular bearing seal 32 of bearing metal which is provided with an external annular recess 34 which snugly receives the inner edge of the supporting ring. At the right of the recess, bearing seal 32 is provided with a flange 36 which extends outwardly along the side face of supporting ring 18. Bearing seal 32 is of greater diameter than the outside diameter of shaft 11 so that the shaft does not contact the bearing seal.

The right-hand end of bearing seal 32 is provided with an annular sealing face 38, against which is held the sealing face 42 of a rotating bearing ring 40 also of bearing metal. To the right of bearing ring 40 is positioned a shaft-sealing ring 44 of rubber-like material, in this embodiment, synthetic rubber, which is force fitted on shaft 11 to form a fluid-tight seal along the shaft. At the left end, shaft-sealing ring 44 is provided with a peripheral flange 46 having the same outside diameter as rotating bearing ring 40. Rotating bearing ring 40 is rigidly held upon flange 46 by an enclosing flanged sleeve 48 which, at its right end, has an inwardly extending flange 50. The right-hand end of shaft-sealing ring 44 is surrounded by a metallic sleeve 52, the left end of which extends into but does not engage the flanged end of flanged sleeve 48.

Resiliently contacting flange 50 is the right end of a compression spring 54 which exerts resilient pressure to the left through flanged sleeve 48 and shaft-sealing ring 44 to rotating bearing ring 40 and through the sealing faces 42 and 38 to bearing seal 32. The pressure exerted by spring 54 is such that sealing sleeve 44 tends to slide to the left along the shaft, and because of the resilient mountings of rotatable bearing ring 40 and bearing seal 32, sealing faces 38 and 42 are forced into complete alignment with sufficient pressure between the sealing faces to prevent leakage of fluid therealong. The force fit of shaft-sealing ring 44 upon shaft 11 prevents leakage along the shaft, while the distorted condition of the periphery of rings 16 and 18 prevents leakage along the inner surface 56 of the hub. In a like manner, the distorted condition of ring 18, combined with the pressure holding flange 36 against the right side of supporting ring 18, prevents leakage through the center of the supporting ring.

At the right of spring 54 is a sealing unit similar to that at the left, there being a shaft-sealing ring 58, similar to shaft-sealing ring 44, having a sleeve 60 corresponding to sleeve 52 and a flanged sleeve 62 corresponding to flanged sleeve 48, which supports rotating bearing ring 64 corresponding to rotating bearing ring 40. Rotating bearing ring 64 is provided with a sealing face 66 which cooperates with a sealing face 68 upon a bearing seal 70, corresponding to bearing seal 32, and having a flange 74. Bearing seal 70 is supported upon outer supporting ring 26 through an external annular recess 72 upon the bearing seal, which snugly receives the inner edge of the supporting ring.

Shaft-sealing ring 58 is of the same material as shaft-sealing ring 44, in this embodiment synthetic rubber, and is force fitted upon shaft 11 to provide a fluid-tight seal about the shaft. Rotating bearing ring 64 and bearing seal 70 are of bearing metal, and they are spaced from shaft 11 so that they are not contacted by the shaft during operation. End cover plate 28 is also spaced from the shaft and from bearing seal 70 so that the end cover plate contacts only the outer supporting ring 26 and the end face 76 of hub 12.

The space around the shaft between the two sealing units is filled with lubricating oil which is substantially at the pressure of the fluid within the pump casing (at the left). This lubricating oil effectively lubricates the various bearing surfaces such as sealing faces 38, 42, 66 and 68, and in addition, assists in providing an efficient seal.

The two sealing units operate substantially independently in performing certain of the functions, but each is automatically adjusted by spring 54 so that mechanical defects due to wear, or appearing during manufacture, need not be separately accounted for. The rigid outer construction formed by the clamping action between end cover plate 28 and flange 14 tends to distort rings 16, 18 and 26 to cause them to tend to bulge inwardly. Space is provided to permit such bulging, and in this condition, fluid-tight seals are provided along the surfaces of the rings. At the same time, bearing seals 32 and 70 are resiliently held so that they may move to the right or the left or so that they may cant without disrupting the seal.

The resiliency of shaft-sealing rings 44 and 58 permits their flanges 46 and 59 to be flexed as a result of the pressure of spring 54 so that the positions of rotating bearings 40 and 64 may accommodate themselves to their proper positions. When such accommodation involves movement to the right or the left along the shaft, this is largely accomplished by the sliding of the shaft-sealing rings 44 and 58 along the shaft, though the pressure must be relatively great to cause such sliding. Under some circumstances, the force fit of rings 44 and 58 may be too tight to permit such sliding movement, in which case, the flexing of the flanges 46 and 59 permits sufficient movement of the rotating bearings to give a tight seal.

It will now become clear that a thoroughly practical and durable packing gland construction has been provided which operates efficiently and in which the several objects hereinabove mentioned, as well as many others, are accomplished.

As many possible embodiments may be made of the above invention, and as many changes might be made in the embodiment above set forth, it is to be understood that all matter hereinabove set forth, or shown in the accompanying drawing, is to be interpreted as illustrative and not in a limiting sense.

I claim:

1. In a packing gland construction for providing a fluid-tight seal between a shaft and a wall structure through which the shaft extends, the combination of: two substantially independently operating sealing units which are positioned in spaced relationship along said shaft with each unit forming a fluid-tight seal between the shaft and the wall structure to thereby form a fluid chamber which is adapted to contain a lubricating fluid, each of said sealing units comprising, a shaft sealing ring tightly grasping the shaft to thereby form a seal around the shaft and having an outwardly extending resilient flange portion, a flanged metallic sleeve snugly receiving said flange portion and having a cooperating flange extending inwardly along and overlapping the side of said flange portion nearest the central portion of said chamber, a bearing ring retained by said sleeve and tightly engaging said shaft sealing ring at the end farthest from the central portion of said chamber, said bearing ring having an inner diameter such that it may move and tilt freely with respect to said shaft and having at its end a bearing face, a cooperating bearing ring having a cooperating bearing face tightly engaging said first-mentioned bearing face, said cooperating bearing ring having an external groove, a resilient sealing ring fitted into said groove and encircling and snugly receiving said cooperating bearing ring to thereby provide a flexible support for said cooperating bearing ring, and clamping means engaging and rigidly holding said resilient sealing ring and providing a fluid-tight seal along the periphery of said resilient sealing ring with respect to said wall structure, the peripheral portion of said resilient sealing ring being positively distorted so that said resilient sealing ring is displaced toward said cooperating bearing ring in a uniform manner; and compressed spring means within said chamber exerting pressure in opposite directions upon the two flanged sleeves of the two sealing units.

2. In a packing gland construction for providing a fluid-tight seal between a shaft and a wall structure through which the shaft extends, the combination of: two substantially independently operating sealing units which are positioned in spaced relationship along said shaft with each unit forming a fluid-tight seal between the shaft and the wall structure to thereby form a fluid chamber which is adapted to contain a lubricating fluid, each of said sealing units comprising, a shaft sealing ring construction mounted upon the shaft to thereby form a seal around the shaft and having an annular bearing seal surface, a bearing ring having an annular bearing seal surface coincident with the first-mentioned bearing seal surface and forming a fluid-tight seal therewith, said bearing ring having an external groove, a flexible supporting ring snugly encircling said bearing ring and extending radially therefrom and said supporting ring having its inner periphery positioned in said groove, said flexible ring having annular side surfaces; clamping means providing rigid stationary support for said flexible rings comprising, a cylindrical spacer construction having an outside diameter which is substantially the same as the outside diameter of said flexible rings and having its annular end surfaces engaged by the adjacent side surfaces of the two flexible rings with the end walls of the spacer construction extending along only the portions of the side wall surfaces of the flexible rings contiguous to the outer periphery of the flexible rings, a stationary annular member engaging the other side surface of one of said annular rings, and an annular clamping plate clamped against the other side surface of the other of said flexible rings with the result that the two flexible rings are positively squeezed about their peripheral portions and are thereby distorted inwardly toward their respective sealing rings; and a spring positioned between said shaft sealing rings and exerting a continuous force upon the two shaft sealing rings to hold the bearing seal surfaces together.

3. In a packing gland construction for providing a fluid-tight seal between a shaft and a wall structure through which the shaft extends, the combination of, a shaft sealing ring construction mounted upon the shaft to thereby form a seal around the shaft and having an annular bearing seal surface, a bearing ring having an annular bearing seal surface coincident with the first-mentioned bearing seal surface and forming a fluid-tight seal therewith, said bearing ring having an external groove, a flexible ring snugly encircling said bearing ring and extending radially therefrom to the wall structure and said flexible ring having its inner periphery positioned in said groove, said flexible ring having a thickness which is substantial with respect to the distance between said bearing ring and the wall structure to thereby provide a firm annular wall, and clamping means positively squeezing the flexible ring by exerting pressure upon portions of the opposed annular surfaces of said flexible ring which are adjacent the periphery of the flexible ring whereby the flexible ring is distorted and bulges inwardly in a uniform manner toward said bearing ring.

4. Apparatus as described in claim 3 wherein said groove is formed by a pair of annular flanges which extend radially upon opposite sides of said flexible ring with one radial flange adjacent said bearing seal surface and extending outwardly to overlap an opposed annular flange portion of said wall structure.

HERMAN RICHARD ARF.